Nov. 11, 1924.
J. J. DILKS
1,515,343
FILM REENFORCEMENT AND METHOD OF MAKING SAME
Filed Feb. 12, 1924
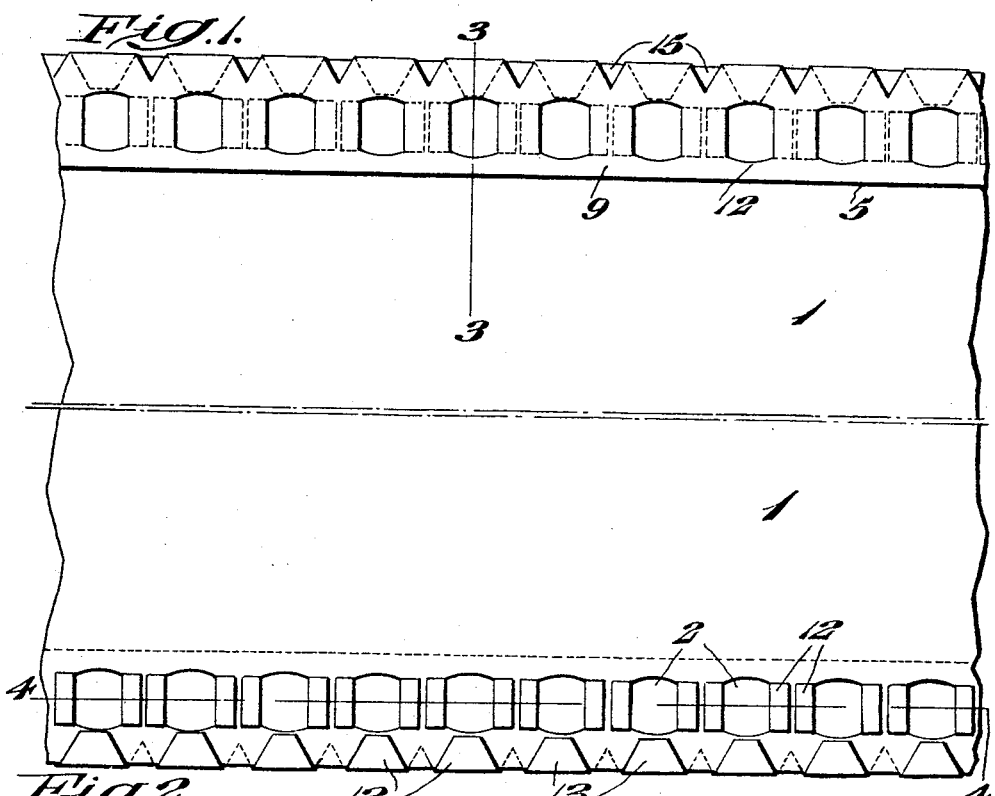
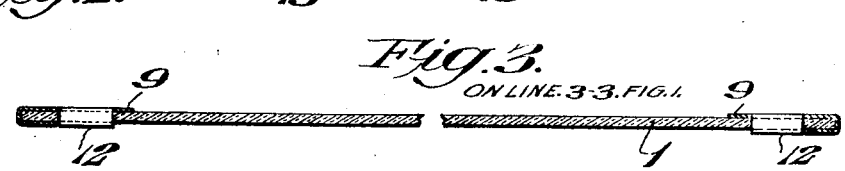
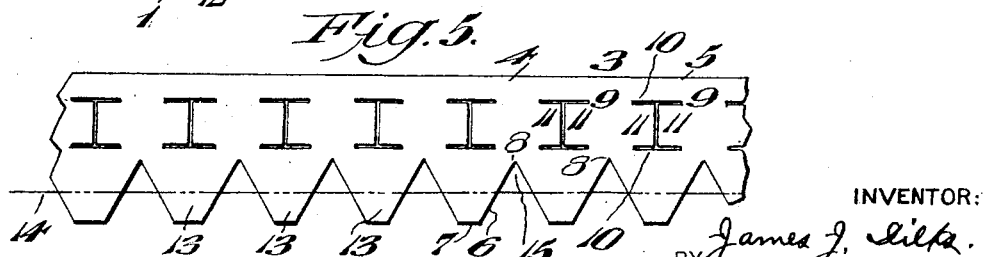
INVENTOR:
James J. Dilks.
BY
ATTORNEYS.

Patented Nov. 11, 1924.

1,515,343

UNITED STATES PATENT OFFICE.

JAMES J. DILKS, OF PHILADELPHIA, PENNSYLVANIA.

FILM REENFORCEMENT AND METHOD OF MAKING SAME.

Application filed February 12, 1924. Serial No. 692,292.

*To all whom it may concern:*

Be it known that I, JAMES J. DILKS, a citizen of the United States, residing at the city of Philadelphia, in the county of Philadelphia and State of Pennsylvania, have invented a certain new and useful Film Reenforcement and Method of Making Same, of which the following is a specification.

The present invention relates, generally stated to moving picture films and has more especial relation to metal reinforcing, binding and protecting tapes as applied to the marginal edges of such films.

Practice dictates that it is desirable to reinforce both the marginal edges of a motion picture film and the feed-wheel receiving perforations adjacent its said edges. Practice further dictates that the amount of metal employed in reenforcement, binding and protecting tapes used for the purpose must be reduced to a minimum. This is because the film itself being flexible any arrangement of reenforcement tending to destroy such flexibility is detrimental to the proper functioning of a film through a projecting machine.

The leading object of the present invention therefore is to provide a novel form of metal tape for reinforcing both the marginal edges of a film and the feed-wheel apertures adjacent thereto in which the parts are arranged to provide maximum protecting and binding surface with the employment of a minimum amount of material in order to promote film efficiency. A further object resides in the arrangement, construction and combination of parts for attaining the results sought by said leading object. With these and other objects in view the invention consists of the improvements hereinafter described and finally claimed.

The nature, characteristic features and scope of the invention will be more fully understood from the following description taken in connection with the accompanying drawings in which:

Fig. 1, is a fragmentary view of a film illustrating the upper face thereof as reinforced in accordance with the invention.

Fig. 2, is a similar view illustrating the under face thereof as correspondingly reinforced.

Fig. 3, is a view in cross-section taken upon the line 3—3 of Fig. 1.

Fig. 4, is a view in longitudinal section taken upon the line 4—4 of Fig. 2, and Fig. 5, is a fragmentary view, in plan, of reinforcing, binding and protecting tape as stamped from a blank ready for application to the marginal edge of a film.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the practice of the present invention and referring now more particularly to Fig. 5, a reinforcing tape designated 3 is stamped from a single blank in substantially the form shown in said figure. The body of the tape or strip is designated 4, one marginal edge of which is rectilinear as at 5 and the opposite edge of which is serrated as at 6, the cut-away portions 15 being of inverted V-shape and each part 13 which is left intact therebetween having a rectilinear edge 7. These intact parts 13 constitute film engaging tongues adapted to be clinched over a longitudinal edge of a film 1, as clearly shown in Figs. 2 and 3. In positioning the tape the tongues 13 are bent over upon the film, the line 14 in Fig. 5, indicating the place of bending. The body 4 of the tape or strip is provided with a continuous series of feed-wheel aperture engaging tongues. These tongues are stamped from the blank so that there is a slitted portion between opposed tongues 11 and so that slitted parts 9 parallel the body edge 5, the slits being H shaped. The parallel walls 10 are substantially coincident with the width of the feed-wheel receiving apertures 3 in film 1. In use the tongues 11 are depressed through the apertures 3 of a film and the free ends thereof bent over upon and clinched with respect to the film as clearly indicated at 12 in Figs. 2, 3 and 4. As indicated in Fig. 5, an apex 8 of an inverted V-shaped portion is positioned intermediate adjacent sets of tongues. Thus the intact or tongue parts of the body are opposite the apertures 3 where reenforcement is most desirable. With a film marginally reinforced by flexible metal tape as above described the feed-wheel receiving apertures are protected against wear, the emulsion side of the film prevented from being scratched or rubbed, the edge of the film secured against tearing and the film itself unimpaired as to flexibility. Flexibility is assured a film because between adjacent clincher tongues 13 an absence of metal leaves exposed sufficient film material, indicated at 15 in Fig. 1, to accomplish this result. While assuring flexibility of the film this cut-away part of the tape is not calculated to detract from the protective feature as embodied in the invention.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is:

1. The herein described method of marginal reenforcement of motion picture films including the feed-wheel receiving apertures complemental thereto which consists in positioning a metal tape having a serrated edge and longitudinally arranged H shaped slits upon a film, next causing parts of said tape to engage within the said apertures and to be clinched longitudinally upon the film underside and causing the serrated edges of said tape to engage in spaced relation an outer edge of the film and to be clinched laterally upon the film underside, whereby a laterally clinched part is positioned opposite and adjacent to a feed-wheel receiving aperture.

2. The hereindescribed method of reinforcing the edges of a motion picture film, which consists in superimposing upon a film edge, a reenforcement having serrations in its outer edge and a series of longitudinally arranged H shaped slits in its body, next causing the central tongues of said slits to be clinched through the sprocket holes of said film and the outer portions of said serrations to be clinched around the outer edge of said film and upon the under side thereof.

3. A moving picture film including feed-wheel receiving apertures therein adjacent a longitudinal edge, a flexible metal tape fitted to said film, the outer edge of which tape is serrated to provide spaced tongues which are clinched laterally beneath said film and the body of which tape is provided with tongues in register with and adapted for passage through said apertures which tongues are clinched longitudinally beneath the film, the marginal portions of the film between said spaced tongues being exposed whereby flexibility of the film is unimpaired.

4. A moving picture film including feed-wheel receiving apertures therein adjacent a longitudinal edge, a flexible metal tape fitted to said film, the outer edge of which tape is serrated to provide tongues having inverted V-shaped spaces therebetween said tongues being clinched laterally beneath the film opposite to and in close proximity with said apertures and the body of which tape is provided with tongues in register with and adapted for passage through said apertures which tongues are clinched longitudinally beneath the film, the marginal portions of the film as exposed by said inverted V-shaped spaces maintaining the flexible attributes of the film.

In testimony whereof I have hereunto signed my name.

JAMES J. DILKS.